United States Patent
Tiberghien et al.

(10) Patent No.: US 11,660,668 B2
(45) Date of Patent: May 30, 2023

(54) CONNECTION DEVICE AND CONNECTION ASSEMBLY

(71) Applicant: STAUBLI FAVERGES, Faverges-Seythenex (FR)

(72) Inventors: Alain-Christophe Tiberghien, Sevrier (FR); Philippe Guin, Annecy (FR); Gerald Bertoli, Naves Parleman (FR)

(73) Assignee: STAUBL FAVERGES, Faverges-Seythenex (FR)

( * ) Notice: Subject to any disclaimer, the term of this patent is extended or adjusted under 35 U.S.C. 154(b) by 73 days.

(21) Appl. No.: 17/347,661

(22) Filed: Jun. 15, 2021

(65) Prior Publication Data
US 2021/0394262 A1  Dec. 23, 2021

(30) Foreign Application Priority Data
Jun. 19, 2020 (FR) ...................................... 2006461

(51) Int. Cl.
 *B22D 41/40* (2006.01)
 *B22D 41/50* (2006.01)
(52) U.S. Cl.
 CPC ........... *B22D 41/40* (2013.01); *B22D 41/502* (2013.01)
(58) Field of Classification Search
 None
 See application file for complete search history.

(56) References Cited

U.S. PATENT DOCUMENTS

| 3,214,195 A | 10/1965 | Zahuranec et al. |
| 11,192,180 B2 * | 12/2021 | Schacher ............... B22D 41/22 |
| 2021/0394262 A1 * | 12/2021 | Tiberghien .............. F16L 39/00 |

FOREIGN PATENT DOCUMENTS

| DE | 20212265 U1 | 1/2004 |
| EP | 2398610 | 8/2010 |
| EP | 2623835 A1 | 8/2013 |
| WO | 2013074047 A2 | 5/2013 |
| WO | 2013074047 A3 | 5/2013 |

OTHER PUBLICATIONS

France Search Report dated Jan. 11, 2021, for France Patent Application 2006461 filed Jun. 19, 2020.

* cited by examiner

*Primary Examiner* — Scott R Kastler

(57) ABSTRACT

This connection device (D) comprises a shaft (17) which is mobile in translation, a piston (19) integral with the shaft (17), a sleeve (35) which extends around the shaft (17), this sleeve being movable between a rear position and a forward position, and locking members housed in the sleeve (35), each locking member being movable relative to the sleeve between a locking configuration and a release configuration. The shaft (17) is movable between a disconnected position in which the shaft (17) does not oppose movement of the locking members to their release configuration, and the sleeve (35) is in the forward position, and a connected position in which the shaft (17) opposes movement of the locking members into their release configuration and the sleeve (35) is in the rear position, through an intermediate position, in which the shaft (17) opposes movement of the locking members into their release configuration and the sleeve (35) is in the forward position.

15 Claims, 14 Drawing Sheets

CONNECTION DEVICE AND CONNECTION ASSEMBLY

The present invention relates to a connection device between two plates, as well as a connection assembly comprising such a device.

It is known, in the fields of the steel and foundry industries, to feed a continuous casting machine, for example a rolling mill tundish, from a set of movable transfer ladles filled with molten metal to be discharged at the work position. The movement of the transfer ladles between the workstation, a waiting station and maintenance stations is carried out in a severe environment (over 200° C.), without any manual operations being possible and therefore involves robotized operations to maneuver the transfer ladles and carry out the peripheral connection operations.

Indeed, in addition to an actuation system for opening the transfer ladle, each ladle presents the means for being supplied with different fluids or energy. Each ladle is thus equipped with a multiconnection plate, called "fixed plate", designed to be coupled to another complementary multiconnection plate, called "mobile plate".

The mobile plate is connected to a pneumatic, hydraulic, electrical or other "upstream" supply network. Each ladle used for the tundish then benefits from the fluid and energy supplies via this temporary and removable connection.

At the waiting station, the ladle (and its fixed plate), a robotic cell, on the mobile plate side, ensures the maneuvering of approach and coupling of the multiconnection plates. In particular, a robot is in charge of partially carrying out the operation of centering and bringing together the two plates. One step consists in bringing the plates closer together under the action of the robot, in particular by engaging a central shaft of the mobile plate in the fixed plate in order to lock it in position.

Finally, a last step consists, from a threshold value of axial approach of the plates, in that a shaft mechanism in the center of the plates takes over from the robot and ensures the final approach of the plates and their locking, at a controlled speed and under a controlled effort. This step is carried out by a connection device which is the object of the present invention and not by the robot.

It is therefore necessary, after engagement of the shaft in the fixed plate, helped by robotic means, to lock its position in the plate and to initiate the bringing together of the plates by means of a piston integral with the shaft in order to secure the coupling of the multiconnection plates.

WO-2013/074 047-A2 describes, for example, a manual locking device, the operating steps of which are not detailed.

EP 0247956 describes a locking mechanism for assembling the connecting elements of the support elements. A locking mechanism is incorporated into the movable member to receive and lock the tubular shaft of the fixed support member. After the latch has been snapped onto the shaft by manual action, the two support elements are forced together by pneumatic or hydraulic assistance from a piston.

However, the latching solution requires specific spring means and can be activated even if the support elements are still closing together, which is dangerous for the installation. Moreover, the position of the support elements is not locked.

EP 2226140 describes a device for controlling the opening and closing of a control valve for casting liquid metal, comprising means for coupling an external drive cylinder to a valve housing and a system for locking a shaft to the valve. The locking and the coupling of the drive cylinder to the valve are carried out simultaneously at the housing unit which is integral with the valve and at the housing, which is hydraulically distant, by a control unit. When unlocking, the control unit uncouples the coupling means and also hydraulically unlocks the cylinder.

To open or close the valve, the control unit has to manage several pipes, which is not advantageous and multiplies the circuits and the sealing means of the chambers in a costly way. Moreover, the safety of the locking is linked to the connection and pressure maintenance in the hydraulic chambers, which is not entirely satisfactory. In contrast to stabilized, so-called tamper-proof mechanical positions, which remain in place despite potential leaks, the elements of EP 2226140 are subject to different pressure forces, which does not guarantee their function over time and leads to risks of malfunction.

The invention intends to remedy these disadvantages by proposing a new connection device for multi-connection plates which improves the state of the art in the field of connection for the steel industry.

To this end, the invention relates to a connection device between two plates, one being a fixed plate and the other being a movable plate, each of the two plates supporting at least one circuit connection element of the hydraulic, pneumatic or/and electrical type intended to connect with a connection element of the same type on the other plate, the connection device being disposed on one of the two plates and comprising:
- a body extending along a central axis and comprising a main cavity,
- a shaft movable in translation in the body along the central axis of the body,
- a piston, integral with the shaft, movable within the main cavity of the body and dividing the main cavity into a front chamber and a rear chamber.

This device is characterized in that the connection device also comprises:
- a sleeve extending around the shaft, this sleeve being movable along the central axis relative to the body between a rear position and a front position,
- locking members housed in the sleeve, each locking member being movable relative to the sleeve between a locking configuration where each locking member is spaced from the central axis and a release configuration where each locking member is closer to the central axis than in the locking configuration, the shaft being movable along the central axis between:
- a disconnected position in which the shaft does not oppose movement of the locking members into their release configuration, and the sleeve is in the forward position,
- and a connected position, in which the shaft opposes the movement of the locking members in their release configuration, and the sleeve is in the rear position,
- through an intermediate position situated between the disconnected position and the connected position, in which the shaft opposes the movement of the locking members in their release configuration, and the sleeve is in the forward position.

With the invention, the mechanical locking of the shaft and the bringing together of the plates are achieved by a single pressure command on the piston.

According to advantageous but non-mandatory aspects of the invention, such a connection device may incorporate one or more of the following features, taken according to any technically permissible combination:

The connection device comprises means for elastically returning the sleeve to the forward position.

The body has a mechanical stop limiting the forward movement of the sleeve in the forward position of the shaft.

The locking members are locking balls, and the sleeve comprises radial housings able to guide the locking balls between their locking and release configurations.

The shaft comprises a guide ramp for guiding the locking members between their release configuration and their locking configuration.

The guide ramp has a distant bearing diameter configured to carry the locking members in their locking configuration, and the shaft comprises a groove juxtaposed on the rear of the guide ramp and presenting an adjacent bearing diameter that allows movement of the locking members into the release configuration.

The connection device comprises means for locking the shaft in the body along the central axis of the shaft in the connected position.

The locking means comprise at least one locking ball radially movable in a recess of the cylinder body between a protruding position, where the locking ball is able to penetrate a groove in the shaft and oppose axial displacement of the shaft relative to the body, and a retracted position, where the locking ball does not penetrate the groove in the shaft.

The locking means also comprise a locking ring movable in an auxiliary cavity of the body along the central axis between a locking position in which a truncated conical surface of the locking ring holds the locking ball projecting into the groove of the shaft, and a release position in which the locking ball is in its retracted position and received in a groove in the locking ring.

The truncated conical surface of the locking ring defines a taper that flares towards the groove of the locking ring.

The device comprises an elastic return element for returning the locking ring to its locking position.

The connection device comprises a protection ring surrounding the shaft, movable along the central axis in an internal channel in which the shaft moves, and driven by the shaft during its movement from the intermediate position to its connected position, between a protecting position in which the protection ring faces the body housing so as to hold the locking ball in a retracted position, and a retracted position in which the protection ring no longer holds the locking ball in the retracted position.

The locking ring and the auxiliary body cavity define a chamber connected to a pipe that provides a pressurized fluid supply to the chamber.

The device comprises a first conduit connected to the front chamber and a second conduit connected to the rear chamber, the first conduit and the second conduit for supplying pressurized fluid to the front chamber and the rear chamber, respectively.

The invention also relates to an assembly for connecting a mobile plate to a fixed plate comprising:

a mobile plate supporting at least a first circuit connection element, a fixed plate supporting at least one connection element complementary to the first element of the mobile plate at least one centering member configured to position the mobile plate and the fixed plate relative to each other characterized in that one of the said plates comprises a connection device as mentioned above, the other of the said plates comprising a locking barrel defining a mouth able to axially retain the locking members of the connection device in the locking barrel, when in their locking configuration.

The invention will be better understood and other advantages thereof will become clearer in the light of the following description of a connection device in accordance with its principle, made by way of a non-limiting example with reference to the attached drawings in which:

FIG. 1 represents a connection assembly E of a fixed plate A and a movable plate B complementary to the fixed plate A. The connection assembly E comprises the fixed plate A, the movable plate B, and a connection device D.

Figure 1:
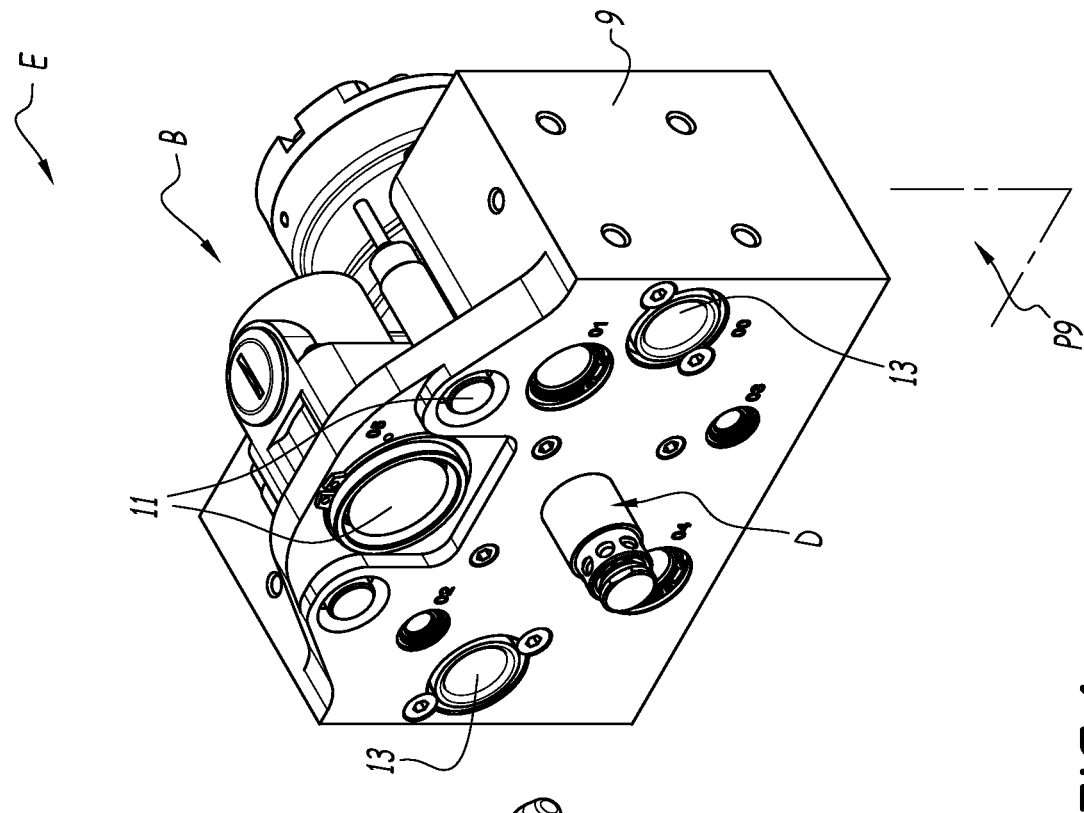
FIG. 1 is an exploded perspective view of a connection assembly in accordance with the invention, comprising a fixed plate and a movable plate.
Figure 1:
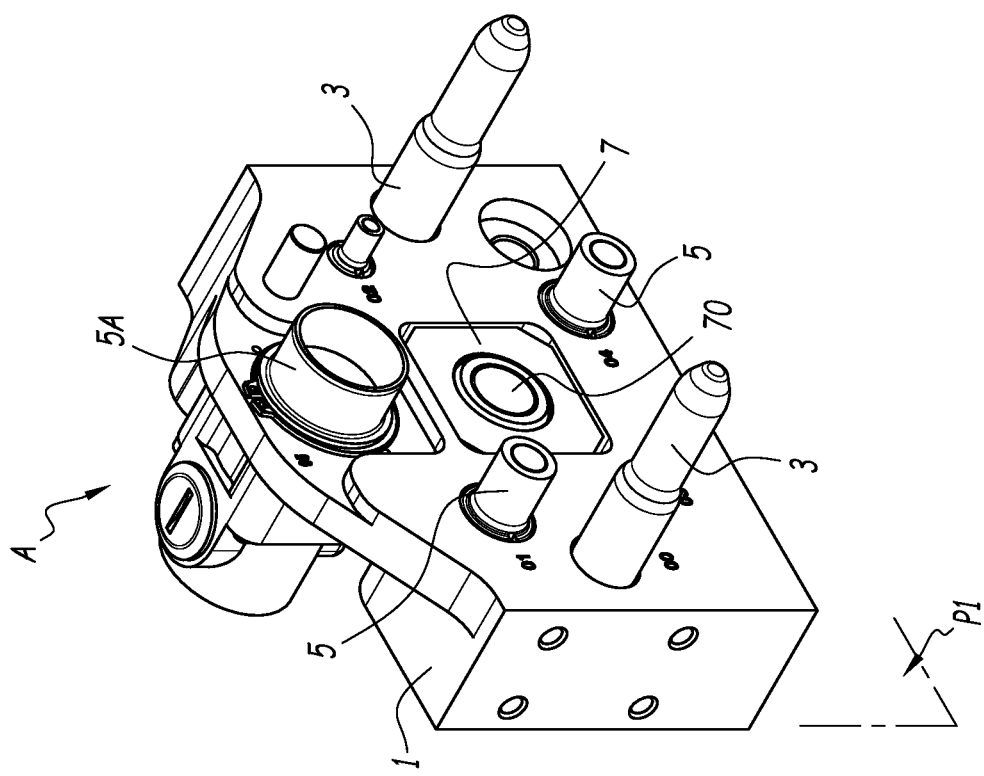

The front, or distant, side of a plate is defined as the side of that plate facing the other plate, i.e., the side of the connecting elements. The rear, or close, side of a plate is defined as the side opposite the contact face of a plate, i.e. the side opposite the connecting elements with respect to the plate.

The fixed plate A consists of a cast body 1 extending mainly in a vertical plane. The fixed plate A is intended to be attached to a transfer ladle not shown, which is mobile or nomadic, intended for continuous casting of metal in a tundish of rolling or foundry machines also not shown.

The fixed plate A has a vertical contact plane P1 from which various male connection elements 5 (e.g. pneumatic, hydraulic, electrical) emerge and two guide columns 3 perpendicular to the contact plane P1 and positioned on one side of the body 1 facing the mobile plate B. For example, the fixed plate A may comprise a tubular upper connection element 5A providing an electrical connection. The connection elements 5 are connected to corresponding downstream circuits via connection passages in the body 1.

A central area of the fixed plate A accommodates a cube shaped hollow movable block 7. In the center of this block is positioned a locking barrel 70 integral with the movable block, itself integral with the body 1, and having a reduced cylindrical mouth which forms a contact face S70 facing the rear of the fixed plate A. This contact face S70 is configured to receive locking members of the mobile plate.

The movable plate B consists of a cast body 9 extending mainly in a vertical plane. The mobile plate B offers a contact plane P9 in which various female connection elements 11 (pneumatic, hydraulic, electrical) and sockets 13 for receiving the guide columns 3 are located, perpendicular to the contact plane P9 and positioned on one side of the body 9 facing the fixed plate A. Various connection passages in the body 9 allow the connection of the connection elements 11 with the corresponding upstream circuits not shown.

The body 9 comprises a central bore 90, cylindrical in shape, designed to accommodate the connection device D. The connection device D includes a cylinder body 15 centered on a central axis X15. In the following, the terms "axial", "radial" and the like are used in reference to the central axis X15.

The cylinder body 15 includes four parts assembled: a main body 150, a flange 152, and a rear cover 154, and a central body 156. The main body 150 is arranged axially between the flange 152 and the rear cover 154.

The connection device D includes a shaft 17. The shaft 17 extends according to a longitudinal axis coincident with the central axis X15 and is integral with a piston 19 immobilized on the shaft 17 and movable in a central cavity 21 of the cylinder body 15 closed by the rear cover 154. The central cavity 21 is defined as a cylindrical enclosure of the cylinder body 15 extending around an axis coincident with the axis X15 of the cylinder body 15. The piston 19 divides the central cavity 21 between a front chamber 21A and a rear chamber 21B. The front chamber 21A and the rear chamber 21B respectively delimit a rear chamber volume and a front chamber volume, which are variable depending on the relative position of the piston 19 in the central cavity 21 according to the central axis X15. In particular, the front chamber 21A volume is delimited by a middle wall 158 of the main body 150 that extends normal to the central axis X15 towards the interior of the main body 150.

The piston 19 defines an outer radial surface 190 in contact with a cylinder wall 210 of the central cavity 21. This outer radial surface 190 carries a seal 192 that is in contact with the cylinder wall 210.

The translational guidance of the shaft 17 in the cylinder body 15 is provided by an inner surface 154A of the centrally drilled rear cover 154, and an inner surface of the centrally drilled middle wall 158 of the cylinder body 15. Each guide surface accommodates an O-ring, each secured by an axially attached pierced cover. The shaft 17 is free to rotate with respect to the cylinder body 15, and according to the central axis X15 of the central cavity 21 but could be indexed in a fixed angular position. A disconnected position, a connected position, and an intermediate position are defined in the relative positions of the shaft 17 with respect to the cylinder body 15.

The shaft 17 extends longitudinally beyond the rear cover 154, and beyond the flange 152 on the front side of the cylinder body 15. An adjacent or rear portion 171 of the shaft 17 may comprise a marker to indicate to the operator the position of the shaft 17 relative to the cylinder body 15.

The cylinder body 15 comprises a cylindrically shaped auxiliary cavity 23 that is delimited axially between a distant wall of the central body 156 and the middle wall 158, and radially delimited internally by the central body 156, which extends around the shaft 17, and externally by the main body 150.

Figure 2:
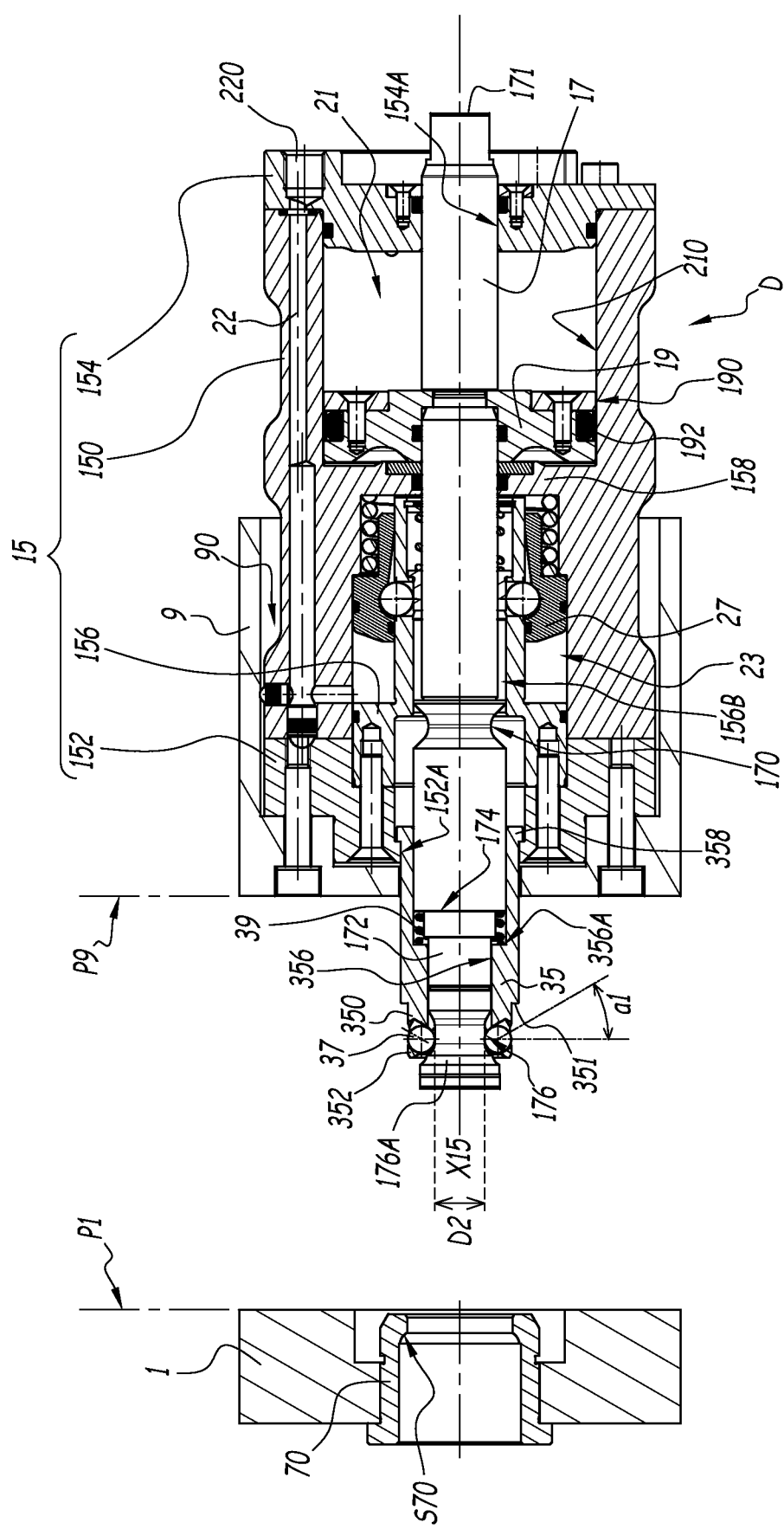
FIG. 2 is a longitudinal section of a connection device according to the invention, and a locking barrel, in a disconnected position.
Figure 3:
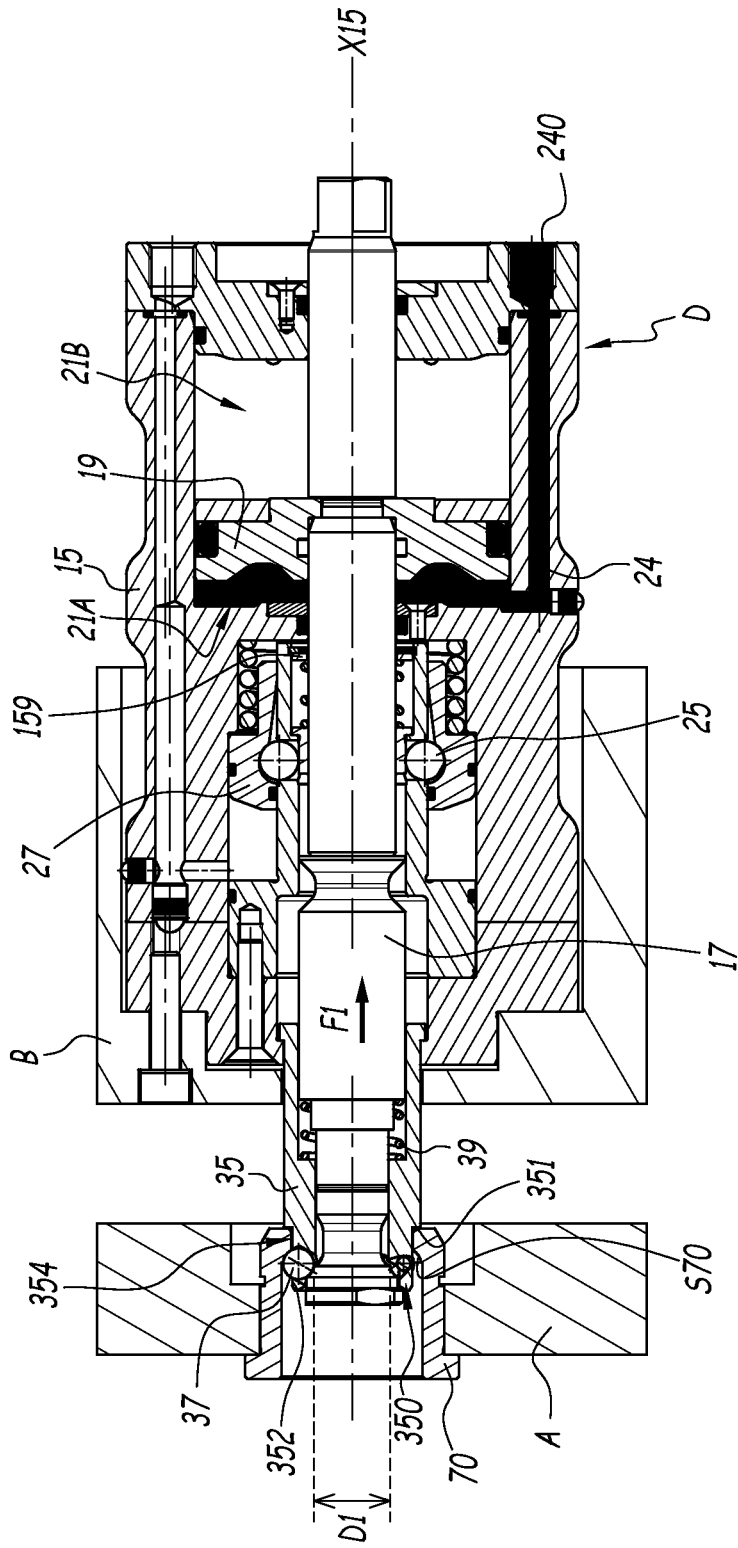
FIG. 3 is a longitudinal section of the connection device of FIG. 2 in an intermediate locked configuration.
Figure 4:
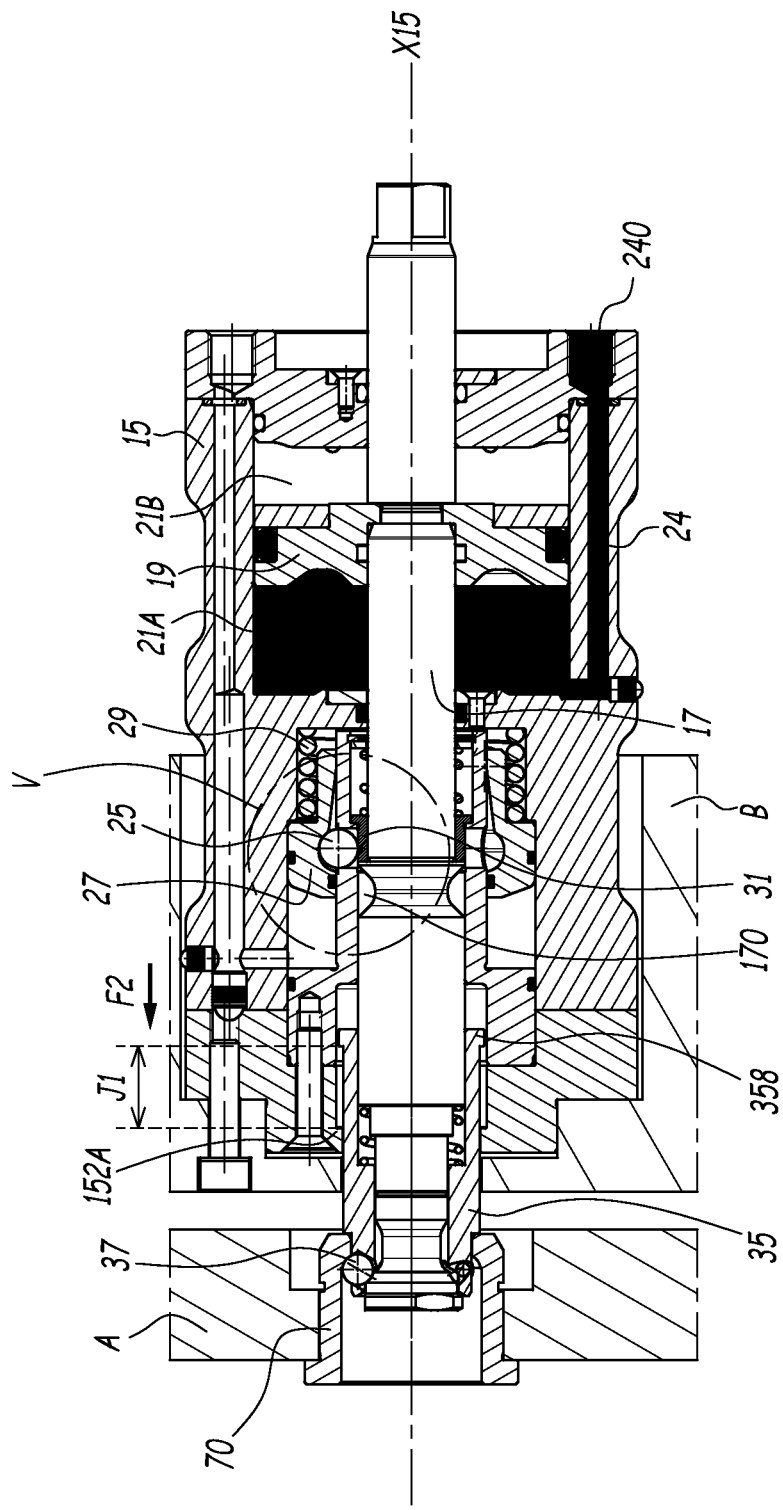
FIG. 4 is a longitudinal section of the connection device of FIG. 2 in a transitional connection phase.
Figure 6:
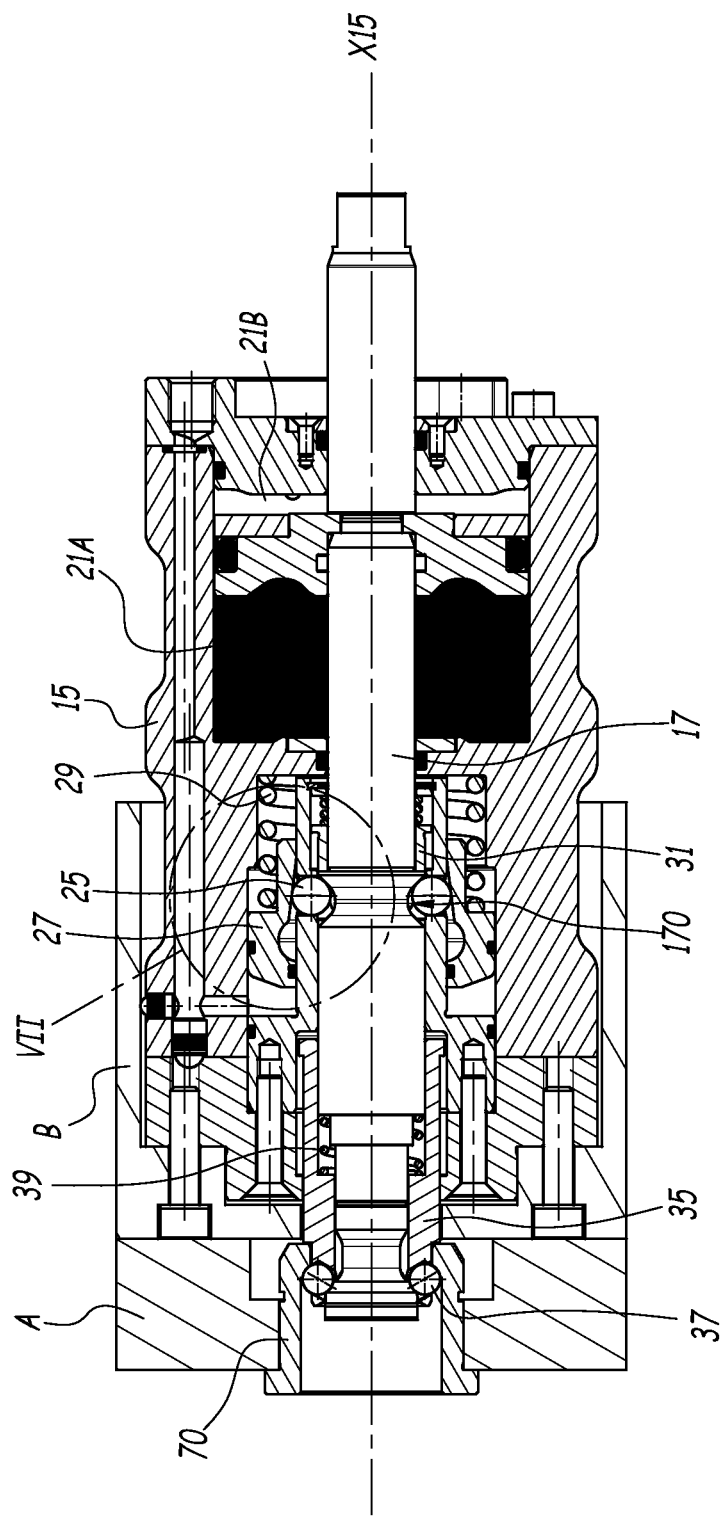
FIG. 6 is a longitudinal section of the connection device of FIG. 2 in a connected position.

The shaft 17 includes a groove 170 that forms a recessed relief of an outer surface of the shaft 17. According to the movement of the shaft 17 relative to the cylinder body 15, the groove 170 is either axially forward of the auxiliary cavity 23 (FIGS. 2 and 3), or axially at the auxiliary cavity 23 (FIGS. 4 and 6).

The central body 156 is generally cylindrical and extends between an adjacent face of the flange 152 and a distant side of the middle wall 158. The central body 156 comprises radial recesses 156A formed in the thickness of the central body 156 wall and in which locking balls 25 are received. The locking balls 25 may be six in number, at least one locking ball 25. The locking balls 25 are radially movable between a protruding position, shown in FIG. 7, in which the locking balls 25 protrude into the groove 170 of the shaft 17. In this position, the locking balls 25 oppose axial movement of the shaft 17 relative to the cylinder body 15. In another position, referred to as a retracted position, the locking balls 25 do not penetrate the groove 25 and do not prevent axial movement of the shaft 17.

The central body 156 defines an internal channel 156B centered on the central axis X15, and in which the shaft 17 moves.

The connection device D comprises a locking ring 27 located radially between the main body 150 and the central body 156. The locking ring 27 presents an internal groove 270 which, when axially aligned with the radial recesses 156A of the central body 156, accommodates the locking balls 25. The locking ring 27 also has a truncated conical surface 272, located at the rear of the internal groove 270, and flared forwardly, i.e., towards the internal groove 270. The truncated conical surface 272 forms a cone with a slope angle of up to about 5°. The locking ring 27 is movable in translation in the auxiliary cavity 23 between a rear position, visible in FIG. 5, where the internal groove 270 accommodates the locking balls 25; and a forward position, visible in FIG. 7, in which the truncated conical surface 272 provides a support surface for the locking balls 25 to hold them in their protruding position.

The locking ring 27, the locking balls 25 and the groove 170 form the means for locking the shaft 17 in the cylinder body 15 along the central axis of the shaft 17 in the connected position.

The locking ring 27 carries two O-rings 274 and 276 on its inner and outer walls, respectively. Between its forward and rear positions, the locking ring 27 forms with the main body 150 and the central body 156 a locking chamber 23A of variable volume, the sealing cross-section of which is determined by the difference in diameter of the two O-rings 274 and 276. The locking chamber 23A is also formed with a front wall 271 of the locking ring 27. This locking chamber 23A is intended to be filled with a control fluid, preferably pneumatic, via a pipe 22 provided in the cylinder body 15 and which opens out at the rear thereof via an orifice 220. The cylinder body 15 comprises a locking spring 29 positioned around a portion 278 of reduced outside diameter of the locking ring 27 and pressing between the middle wall 158 of the cylinder body 15 and an adjacent wall 279 of the locking ring 27. The locking ring 27 is pushed towards its forward position by the locking spring 29. The control fluid present in the locking chamber 23A acts on the locking ring 27 against the spring force of the locking spring 29. The annular space in which the locking spring 29 is located is subject to ambient pressure and is not a sealed chamber, so that only the spring force of the locking spring 29 opposes the action of the control fluid if the pressure in chamber 23A increases.

The cylinder body 15 also comprises a protection ring 31, positioned in the internal channel 156B, radially between the central body 150 and the shaft 17. The protection ring 31 is driven axially forward by a spring 33 pressing on a support disk 159 affixed against an elastic ring, or circlip, partially housed in the central body 156 of the cylinder 15. The protection ring 31 presents an outwardly projecting flange 310 on which the spring 33 presses. The flange 310 rests on a complementary shoulder 156C of the central body 156, which performs a stop function of the protection ring 31 when the latter is axially aligned with the radial recesses 156A of the locking balls 25, and the protection ring 31 holds the locking balls 25 in a retracted position out of the internal channel 1568.

The connection device D comprises a sleeve 35, the wall of which is radially pierced with inclined recesses 350 located on the side of a distant end 352 of this sleeve 35. The sleeve 35 extends around a distant portion 172 of the shaft 17 and is axially movable relative to the cylinder body 15 between a forward position, visible in FIG. 2, and a rear position, visible in FIG. 6.

The inclined recesses 350 of the sleeve 35 are inclined with respect to the central axis X15 by an angle a1 of between 40° and 80°, preferably equal to 60. The inclined recesses 350 define axes secant to the axis X15 at a plane normal to the axis X15 located forward of the inclined recesses 350.

The connection device D comprises locking members, formed by the locking balls 37 housed in the inclined recesses 350. The locking balls 37 may be eight in number. The locking balls 37 are radially guided in the inclined radial recesses 350 and movable between a locking configuration, where the locking balls 37 project relative to an outer surface 354 of the sleeve 35, visible in FIG. 3, and a release configuration visible in FIG. 2. In this position, the locking balls 37 assume a radial position closer to the central axis X15 than in the locking configuration and are thus retracted from the outer surface 354.

The sleeve 35 presents an inner wall 356 forming a shoulder 356A providing a support surface for a spring 39 housed within the sleeve 50 around the shaft 17 and which presses against a forward-facing shoulder 174 of the shaft 17, so that the sleeve 35 is pushed elastically forward. Alternatively, elastic return means other than the spring 39 may provide the elastic return of the sleeve 35 to the forward position.

The flange 152 comprises a central mouth presenting a constricted diameter such as a seat 152A in which the sleeve 35 slides. The seat 152A provides a mechanical stop to a close collar 358 of the sleeve 35, in the forward position of the sleeve 35 relative to the cylinder body 15. The seat 152A provides a mechanical stop, limiting forward movement of the sleeve 35 in the advanced position of the shaft 17.

Optionally, the sleeve 35 may define, on its outer surface 354 behind the inclined recesses 350, an axial stop 351 on a widened diameter allowing a support on a front face of the locking barrel 70 of the fixed plate A.

The shaft 17 defines at its distant end a groove 176 able to receive the locking balls 37 in their release configuration and carry them outwardly in their locking configuration. On a front side of the groove 176, the shaft 17 defines a ramp 176A that slopes towards the rear of the shaft 17 and assists in guiding the locking balls 37 from their release configuration to their locking configuration. The ramp 176A presents a distant bearing diameter D1 configured to carry the locking members in their locking configuration away from the central axis X15. The groove 176 presents an adjacent bearing diameter D2 that is smaller than the distant bearing diameter D1 and thus allows the locking members to move towards the central axis X15 in the release configuration.

Figure 13:
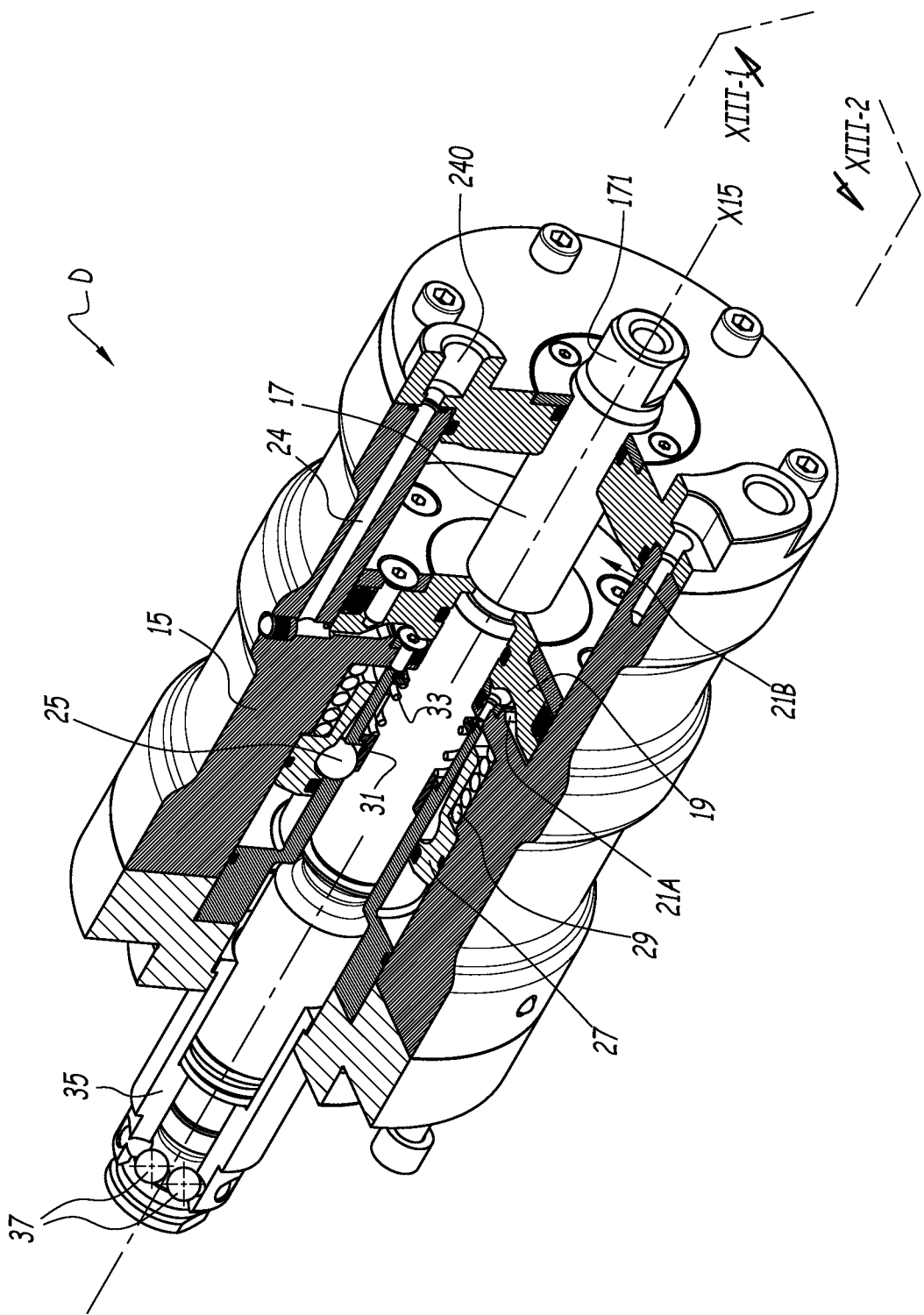
FIG. 13 is a partially sectioned perspective view of the connection device according to planes XIII-1 and XIII-2.

The connection device D also comprises a pneumatic control member not shown, such as a pneumatic valve connected in communication with a computer or a human-machine interface, and manages the circulation of the control fluid through the front and rear chambers 21A and 21B and the locking chamber 23A. Pipes are arranged according to different cutouts in the cylinder body 15 visible in FIGS. 13 and 14 and connect the front chamber 21A, the rear chamber 21B and the locking chamber 23A to respective pneumatic connection elements mounted, not shown, on a rear part of the mobile plate B, and which allow the pressurized connection of the chambers with the pneumatic valve. In particular, at least one pipe 24 is provided to connect the front chamber 21A, with a connection port 240 on the rear of the cylinder body 15, to the pneumatic valve. At least one pipe 26 is provided to connect the rear chamber 21B, with a connection port 260 on the rear of the cylinder body 15, to the pneumatic valve. The valve benefits from a pressurized air system to regulate chamber pressure.

The valve may be double acting to control the position of the piston 19.

The locking chamber 23A can be controlled by a single-acting valve, with the return of the locking ring 27 being ensured by the locking spring 29.

The operation of the connection device D is described with reference to FIGS. 2 to 11. The chambers into which pressurized fluid is injected are colored black.

During the phase of connecting the transfer ladle to the energy and fluid circuits, an operator or a robotic cell starts the connection process of the fixed and mobile multi-connection plates A and B.

The mobile plate B is handled by a robotic cell, not shown, capable of pre-positioning the mobile plate B, in particular its sockets 13, on the guide columns 3 of the fixed plate A, and of carrying out a mutual, partial approach of the fixed plate A and the mobile plate B.

The axial guiding of the fixed and movable plates A and B, the alignment of the connecting elements with each other, and the centering of the shaft 17 with respect to the locking barrel 70 are achieved by the guide columns 3 during the rest of the process.

When the movable plate B is at a distance of about 30 mm from the fixed plate A, for example 24 mm, the shaft 17 engages in the locking barrel 70 of the fixed plate A. The locking balls 37 are free to retract in the release configuration, as they are aligned with the groove 176, with the shaft 17 in the disconnected position (FIG. 2) so that it can be inserted into the fixed plate A. The sleeve 35 is in the forward position.

An end-of-travel detector, such as a proximity sensor not shown, signals to the robotic cell that the moving plate B has reached the point at which the pneumatic control system is supposed to trigger the retraction of the shaft 17. Device D takes over from the robot to bring plates A and B together. With the robot holding the fixed plate A with a certain tolerance of axial displacement, the pneumatic control system controls the supply of the front chamber 21A and allows the volume of air contained in the rear chamber 21B to escape. The increase in pressure in the front chamber 21A causes the shaft 17 to be driven backwards with respect to the cylinder body 15, according to arrow F1 in FIG. 3. This axial drive of a short stroke, for example 4 mm, brings the locking balls 37 into contact with the ramp 176A of the shaft 17. The locking balls 37 are pushed radially outward by the ramp 176A and thus reach their locking configuration against the surface S70. The locking balls 37 form the means for axially retaining the movable plate B relative to the fixed plate A, by limiting the relative movement of the shaft 17 and piston 19 with the locking barrel 70.

The sleeve 35 has reached a forward position, advanced with respect to the shaft 17, while remaining in abutment against the seat 152A of the flange 152. According to an optional aspect, the sleeve 35 is supported against the locking barrel 70 by its stop 351.

The shaft 17 is then in an intermediate position (FIG. 3), in which it is locked in the fixed plate A. The ramp 176A prevents the locking balls 37 from returning to their release configuration. A portion of the shaft 17 protrudes from the back of the movable plate B to a greater extent than in the disconnected position, signaling the completion of the step of locking the shaft 17 into the fixed plate A.

In the further connection process, the robot cell ceases to maneuver the movable plate B, the position of the movable plate B being determined by controlling the axial position of the shaft 17 with respect to the cylinder body 15.

With the sleeve 35 resting against the locking barrel 70, and the shaft 17 held back by the spring 39, the sleeve 35 and the shaft 17 form a displacement shaft for axially guiding the cylinder body 15 and the movable plate B in its final phase of approaching the fixed plate A.

The sleeve 35 may not abut the locking barrel 70. In this case, the position of the cylinder body 15 and the shaft 17 relative to the fixed plate A may present a certain axial floating without consequence on the safety of the connection assembly E.

Figure 5:
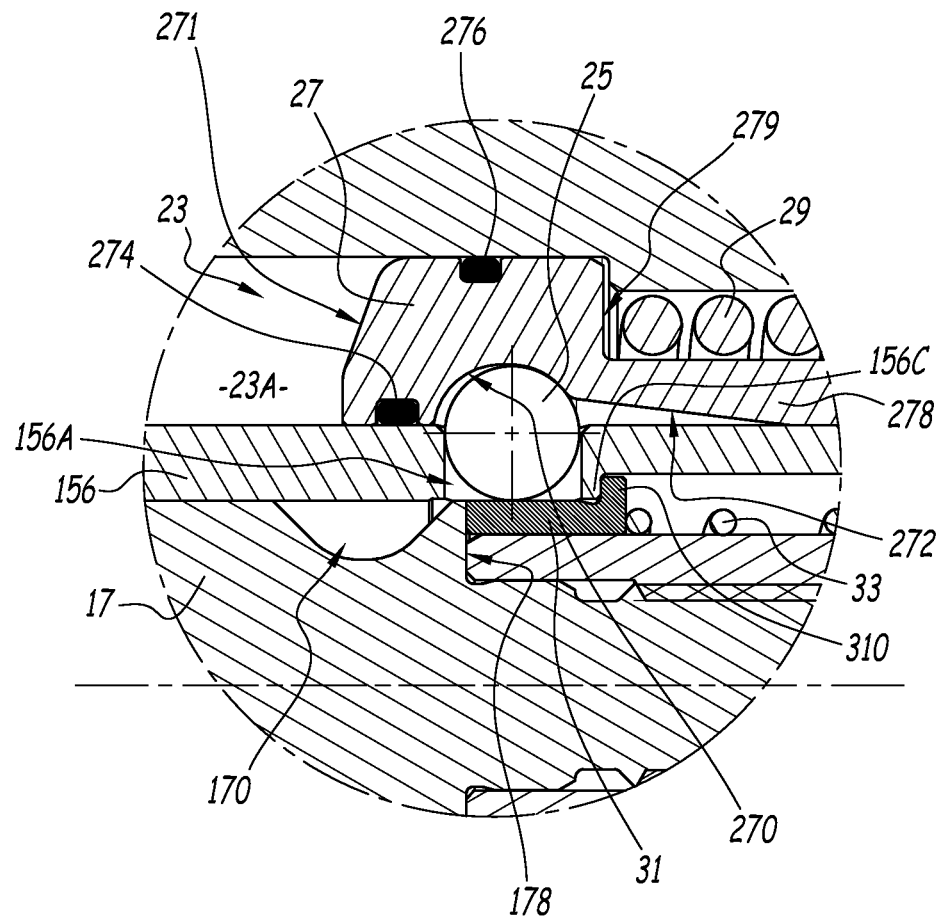
FIG. 5 is a larger scale view of detail V of FIG. 4.

The feeding of the front chamber 21A continues and leads to an increase in volume which tends to push the piston 19 backwards and to push the cylinder body 15 and the mobile plate B forwards according to the arrow F2 in FIG. 4. The locking balls 25 remain held in the groove 270 of the locking ring 27 by the protection ring 31, itself driven forward by its spring 33, in a position of protection of the shaft 17 aligned with the recesses 156A. The protection ring 31 progresses along the shaft 17 under the effect of the recoil of the latter, the protection ring 31 approaching the groove 170 of the shaft 17 until it comes to a stop against a shoulder 178 of the shaft 17 until reaching the rear of the groove 170 (FIG. 5).

As the plates A and B are brought together, an axial clearance J1 is formed between the collar 358 of the sleeve 35 and the seat 152A.

Figure 7:
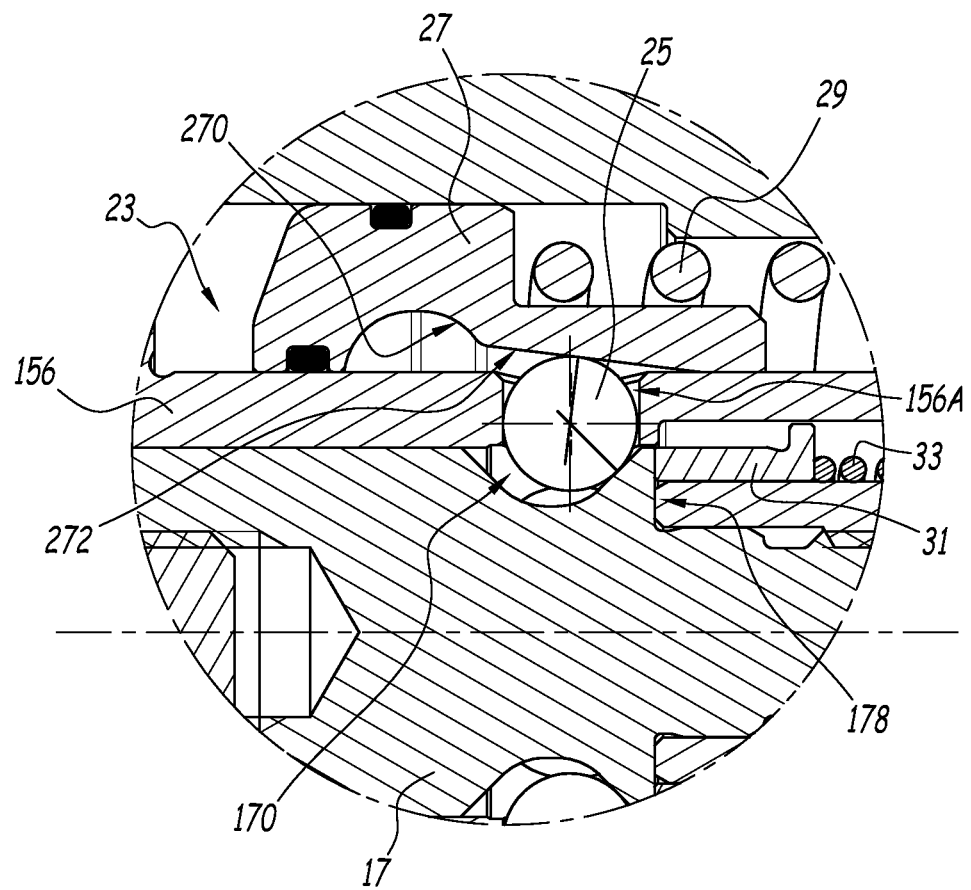
FIG. 7 is a larger scale view of detail VII of FIG. 6.

At the end of the approach stroke of the plates A and B, in FIG. 6, the locking balls 25 come to be axially aligned with the groove 170 and are no longer held by the protection ring 31 which is pushed backwards by the shoulder 178, against the force of the spring 33, into a retracted position, in which the locking balls 25 are no longer held in the groove 270. The locking balls 25 are then pushed radially into the groove 170 by the truncated conical surface 272 so that they no longer project towards the locking ring 27. The locking ring 27, subjected to the elastic force of the spring 29, is driven forward. The truncated surface 272 rests on the locking balls 25 to hold them in the groove 170 through the recess 156A of the central cylinder body 156. The shaft 17 is thus axially locked, as seen in FIGS. 6 and 7.

In the configuration of FIG. 6, the plates A and B are in surface contact, the cylinder body 15, via its central body 150, is locked onto the shaft 17, itself locked onto the front at the locking barrel 70. The peripheral connectors 5 and 11 for connecting plates A and B are coupled so that pneumatic, hydraulic, etc. circuits are established between plates A and B, and more broadly between the fluid/energy networks and the ladle. The connection assembly E is in the connected position, the position is detected by a contact sensor. The shaft 17 is then in the connected position.

In the connected position of the plates, repulsion forces of the order of 150 daN linked to the plate connection circuits tend to push the plates A and B together. These forces tend to push the locking balls 25 backwards into contact with the adjacent wall of the groove, which tends to push them centrifugally back into the recess, into contact with the inner truncated conical wall of the locking ring. The slope is small, so that the centripetal force does not create an axial component opposing the spring that is small enough to push the locking ring against its spring.

The coupled position of the plates is guaranteed by the mechanical locking of the locking balls 25 in the shaft 17 relative to the cylinder body 15, which ensures the mechanical coupling of the connection assembly E is maintained to secure the installation during the circuit feeding operations. Following the feeding operations, the plates A and B are caused to be disconnected. The start of the separation of plates A and B is conditioned by the release of the locking balls 25 by the locking ring 27 to free the translation of the cylinder body 15 with respect to the shaft 17.

Figure 8:
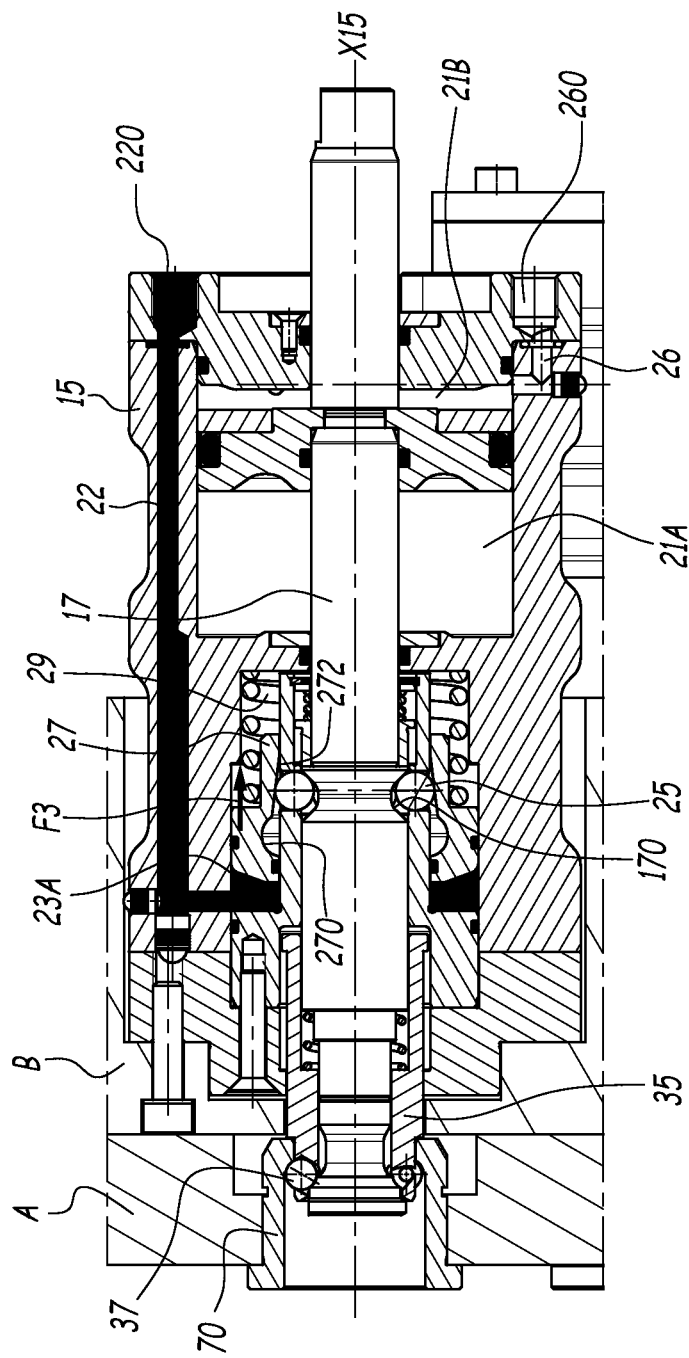
FIG. 8 is a longitudinal section of the connection device in a first disconnection phase.
Figure 9:
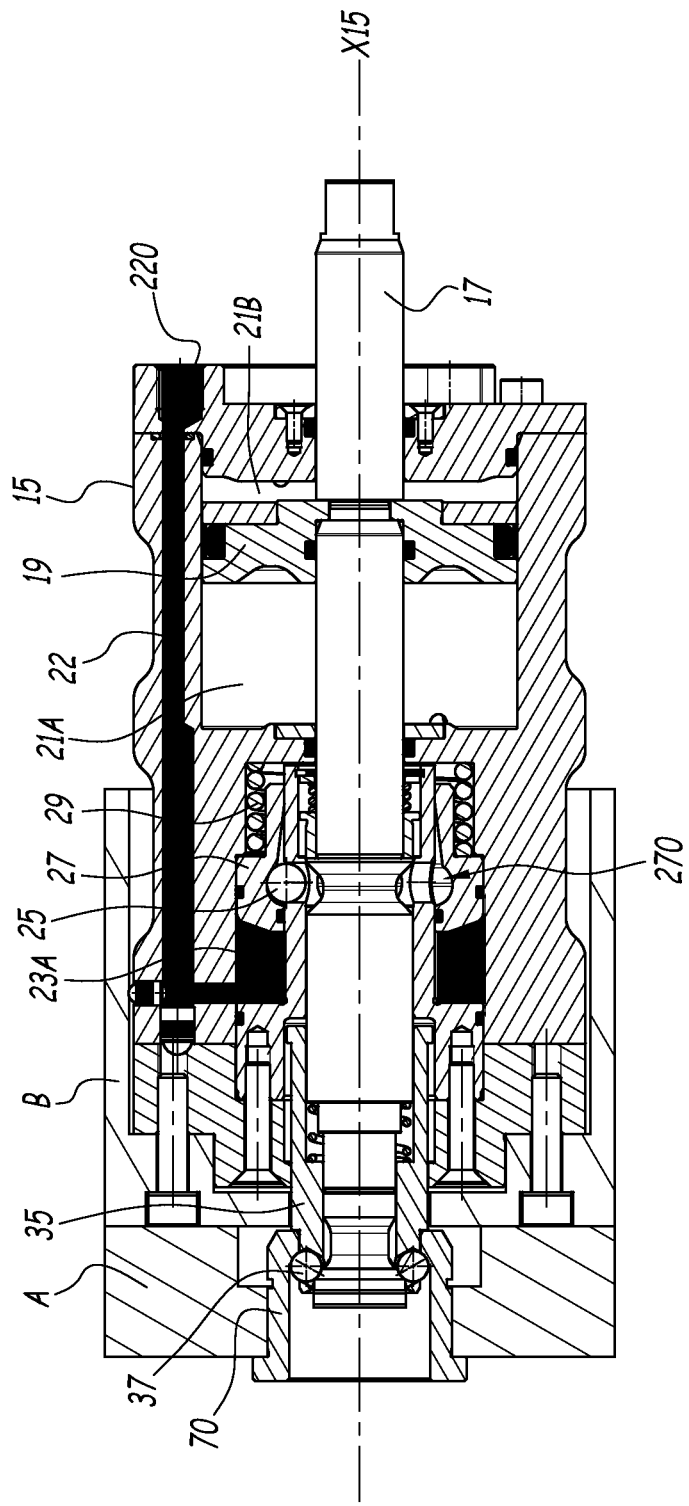
FIG. 9 is a longitudinal section of the connection device in a second disconnection phase.

The pressurization of the locking chamber 23A causes the locking ring 27 to move backwards, according to the arrow F3 in FIG. 8, against the spring 29. The locking balls 25 can then be lodged in the groove 270 of the locking ring 27, as can be seen in FIG. 9.

Figure 10:
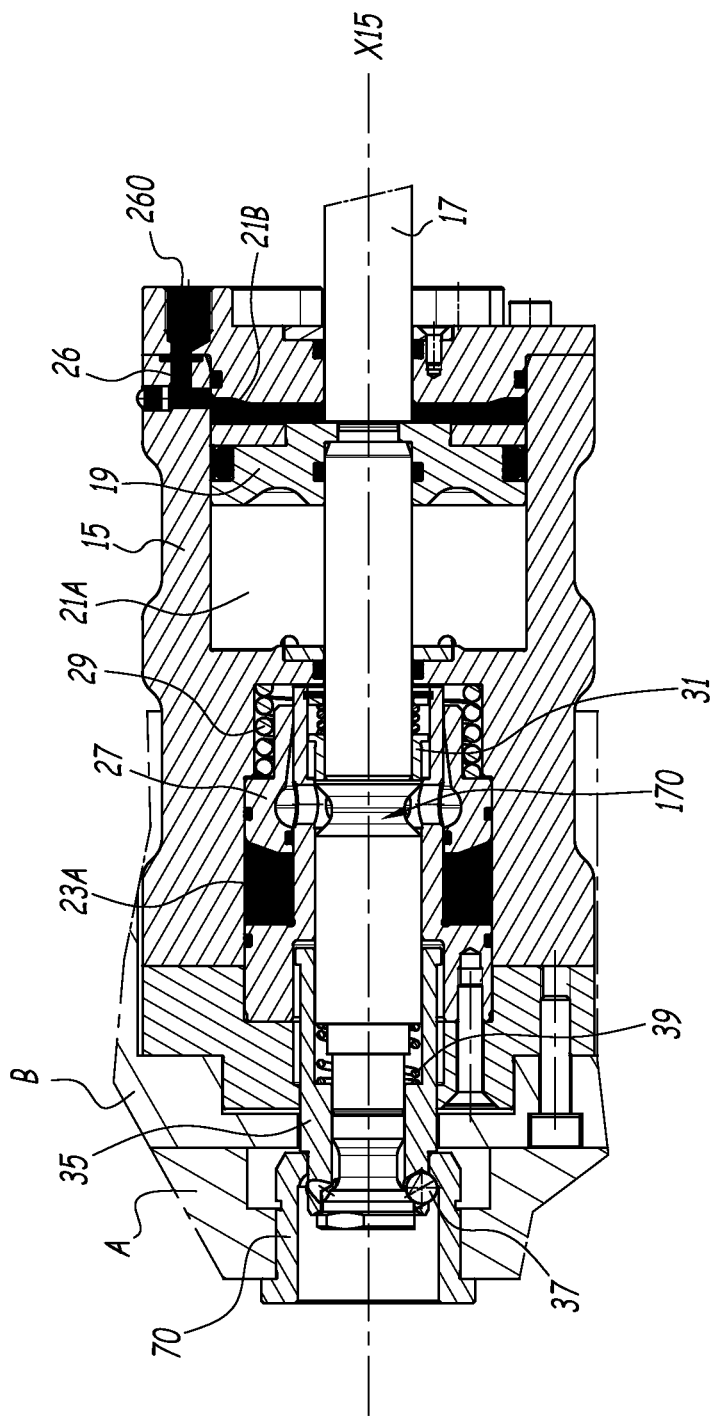
FIG. 10 is a longitudinal section of the connection device in a third disconnection phase.

When the locking ring 27 has returned to the rear position or release position, the maneuver to separate the plates A and B begins in FIG. 10 by feeding the rear chamber 21B, while maintaining the locking chamber 23A under pressure so as not to allow the locking ring 27 to return to the advanced position.

The rear chamber 21B fills and the pressure force created drives the cylinder body 15 backwards with respect to the shaft 17. The relative movement between the cylinder body 15 and the shaft 17 causes the return towards the front of the protection ring 31 under the action of the spring 33, and the positioning of the locking balls 25 around the protection ring 31. The protection ring 31 regains its role of holding the locking balls 25 in their retracted position, housed in the groove 270 of the locking ring 27.

The separating operation continues until the end of the stroke is reached, detected by the associated means, such as the proximity sensor not shown. At this distance, the sleeve 35 is resting against the locking barrel 70 and resting or almost resting on the seat 152A of the flange 152. The robot is able to grasp the mobile plate B again. The shaft 17 is in an intermediate position.

Figure 11:
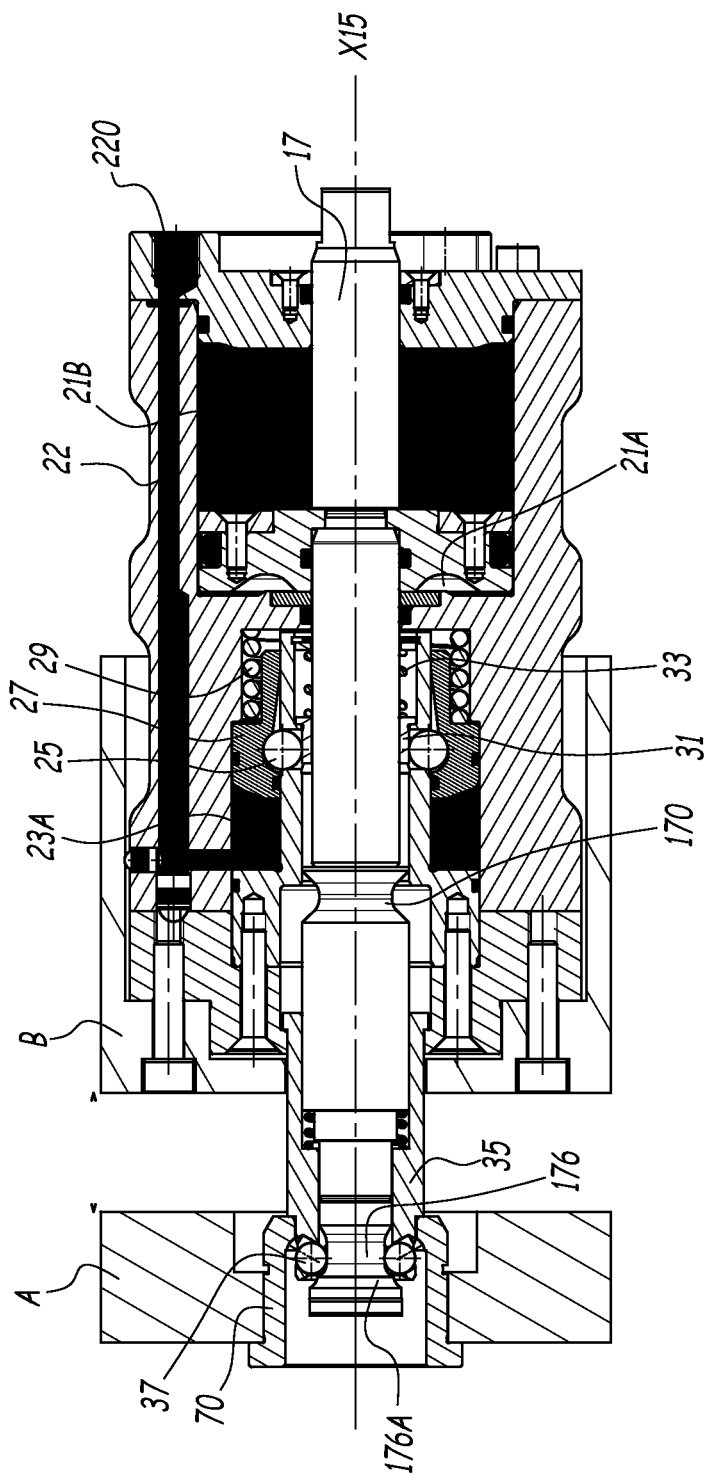
FIG. 11 is a longitudinal section of the connection device in a fourth disconnection phase.
Figure 12:
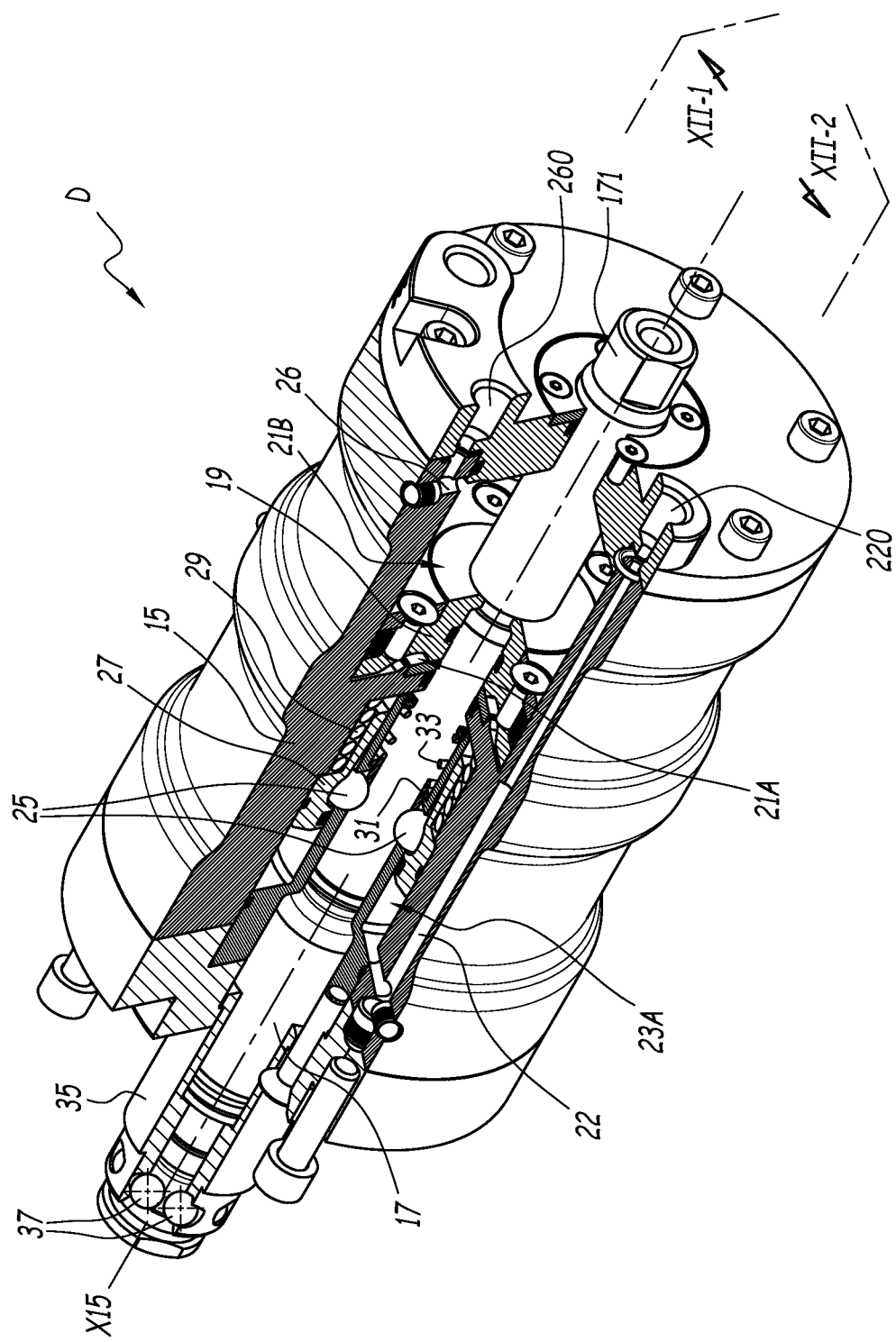
FIG. 12 is a partially sectioned perspective view of the connection device of the figure according to planes XII-1 and XII-2.

The holding of the mobile plate B combined with a rear chamber pressure 21B causes the translation of the shaft 17 forward, while the sleeve 35 is held in contact position with the flange 152. This releases the locking balls 37 from their spread-out position (FIG. 11). The locking balls 37 return to their position in the distant groove of the shaft 17. The shaft 17 is in the disconnected position. Thanks to the limitation of the forward movement of the sleeve 35 by the seat 152A against the forward force of the spring 39, the locking balls 37 are no longer held in the locking configuration. The robot can then take over from the connection device D to move the fixed plate A backwards and in particular disengage the shaft 17 from the locking barrel 70. The sequence of uncoupling and separating of the plates A and B is carried out in reverse to the connection maneuver, so that plate B remains guided by the guide columns 3 and the complementary sockets 13 and driven by the robot with a certain buoyancy.

When the robotic cell has sufficiently moved the mobile plate B away from the fixed plate A, and the sockets 13 away from the guide columns 3, it takes over the mobile plate B to move it out of the area, waiting for a next fixed plate A, and thus a next transfer ladle, to be coupled.

Figure 14:
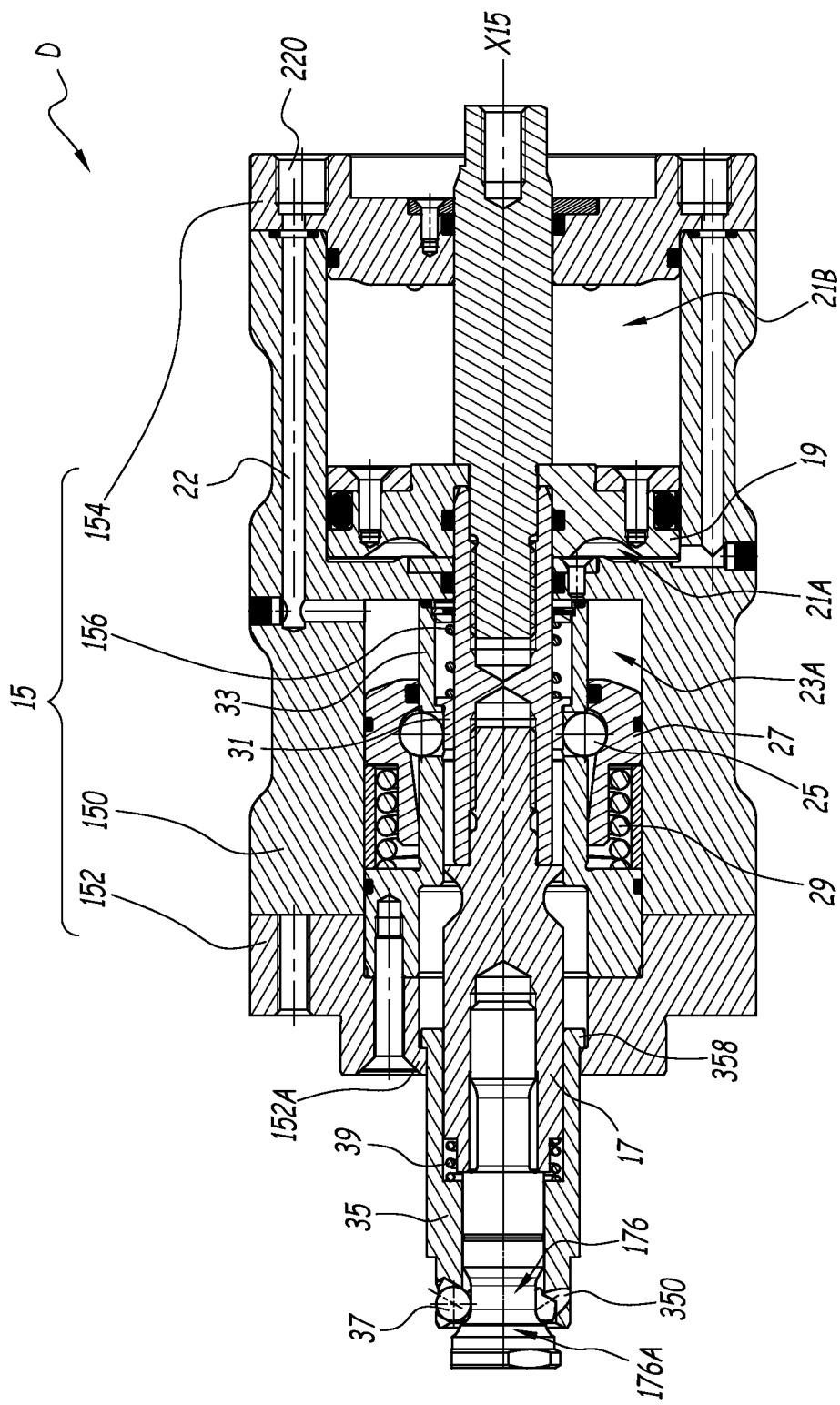
FIG. 14 is a longitudinal cross-section of a connection device according to a second embodiment of the invention.

A second embodiment is shown in FIG. 14. In this embodiment, the elements common to the first embodiment have the same references and function in the same way.

In this embodiment, the locking ring 27 presents reversed kinematics, but an identical locking function. The locking ring 27 is movable between a forward position, in which the locking balls 25 are received in the groove 270 of the locking ring 27, and a rear position, in which the truncated conical surface 272 pushes the locking balls 25 back into the groove 170 of the shaft 17. The spring 29 pushes the locking ring 27 to its rear position.

The invention provides the following advantages:

The axial locking of the shaft 17 with respect to the cylinder body 15 is achieved and maintained by mechanical elements without requiring external pressure or energy.

The locking ring 27 and its truncated conical surface 272 allow for backlash adjustments during connection and disconnection cycles.

A fairly simple design part such as the locking barrel 70 that equips the fixed plate A is sufficient to achieve the secure connection to the connection device D.

The protection ring 31 prevents wear on the shaft 17 that could be caused by the rolling of the locking balls 25 and their radial pressure directly on the shaft 17.

A pneumatic solution is more viable than a motorized and electrical solution in the thermal environment in which the connection device D is used.

A pneumatic solution is favorable in a flammable environment unlike hydraulic cylinders.

The locking of the shaft 17 in the locking barrel 70 is mechanical and independent of a pneumatic control.

The locking of the cylinder body 15 relative to the shaft 17 secures the connection assembly E.

The pneumatic solution for bringing together the two plates A and B, provides a compact, inexpensive, adaptable solution (no limiting standard parts unlike commercial motors), and offers flexibility of movement in a small space due to the two pneumatic chambers.

The use of locking balls 37 and 25 prevents deformation under the disconnection/connection forces of plates A and B. The locking balls 37 provide high cycling capabilities and overcome jamming problems.

According to embodiments not shown:

The pipe 22 for the release chamber 23A may be in fluid communication with the rear chamber 21B. The pneumatic control of the cylinder body 15 towards the rear by injecting air into the rear chamber 21B leads at the same time to the retraction of the locking ring 27 to release the cylinder body 15 from the shaft in translation. Advantageously, the pipe 22 to the release chamber 27 is of a larger diameter, for example 4 mm, than the pipe 26 of the rear chamber 21B, for example 1 mm. Thus, actuation of the shaft 17 is more easily initiated by unlocking the locking ring 27 before pressurization of the rear chamber 21B. This effect is due to the reduced flow rate in the rear chamber 21B which also promotes a damping effect of the shaft 17.

The locking ring 27 may be controlled by a double-acting pneumatic device, and thus does not have an elastic return means such as the locking spring 29.

The connection device D may not include a protection ring 31: the diameter of the shaft 17 at the level of the protection ring 31 would then be increased to be able to retain the locking balls 25 in a retracted position in the locking ring 27, when the balls do not project into the groove 170.

The locking balls 37 could be replaced by other locking members, such as fingers, segments, or movable pins in the sleeve 35.

Similarly, the locking balls 25 may be replaced by different locking elements, such as segments, pins, etc.

The recess 350 of the locking balls 37 may be inclined by different values of angle a1.

The sleeve 35 may be made in two coupled parts.

The spring 39 of the sleeve 35 may be mounted around the shaft 17 at the rear of the sleeve 35, and not within the sleeve 35.

The locking ring 27 may not include a truncated conical surface 272, which may be replaced by a cylindrical surface.

The connection device D is shown mounted on the movable plate B. Alternatively, the fixed plate A may carry the connection device D, while the movable plate B carries the locking barrel 70.

Instead of pneumatic operation, the connection device D may adopt a hydraulic operation, with suitable seals.

This invention is more generally applicable to the field of connecting multi-connection plates, especially for their final approach for coupling.

The invention claimed is:

1. A connection device, configured to bring two plates together, one of the two plates being a fixed plate and the other plate being a movable plate, each of the two plates supporting at least one connection element for a hydraulic, pneumatic and/or electrical circuit, said at least one connection element configured to pair with a complementary connection element on the other plate, the connection device being disposed on one of the two plates and comprising:
   a cylinder body extending along a central axis and comprising a main cavity,
   a shaft movable in translation within the cylinder body along the central axis of the cylinder body,
   a piston, integral with the shaft, movable within the main cavity of the cylinder body and dividing the main cavity between a front chamber and a rear chamber,
wherein the connection device also comprises:
   a sleeve extending around the shaft, this sleeve being movable along the central axis with respect to the cylinder body between a rear position and a front position,
   locking members housed in the sleeve, each locking member being movable relative to the sleeve between a locking configuration where each locking member is spaced from the central axis and a release configuration where each locking member is closer to the central axis than in the locking configuration,
the shaft being movable along the central axis between:
   a disconnected position in which the shaft does not oppose the movement of the locking members in their release configuration, and the sleeve is in the forward position,
   and a connected position, in which the shaft opposes the movement of the locking members in their release configuration, and the sleeve is in a rear position,
   through an intermediate position between the release position and the connected position, in which the shaft resists movement of the locking members into their release configuration, and the sleeve is in the forward position.

2. The connection device according to claim 1, wherein the connection device comprises means for elastically returning the sleeve to the front position.

3. The connection device according to claim 1, wherein the cylinder body has a mechanical stop limiting the forward displacement of the sleeve in the front position of the shaft.

4. The connection device according to claim 1, wherein the locking members are locking balls, and wherein the sleeve comprises radial recesses able to guide the locking balls between their locking configuration and their release configuration.

5. The connection device according to claim 1, wherein the shaft comprises a guide ramp for the locking members between their release configuration and their locking configuration.

6. The connection device according to claim 5, wherein the guide ramp presents a distant bearing diameter configured to carry the locking members in their locking configuration, and wherein the shaft comprises a groove juxtaposed on the rear of the guide ramp and presenting an adjacent bearing diameter that allows movement of the locking members into the release configuration.

7. The connection device according to claim 1, wherein the connection device comprises means for locking the shaft in the cylinder body along the central axis of the shaft in the connected position.

8. The connection device according to claim 7, wherein the locking means comprise at least one locking ball radially movable in a recess of the cylinder body between a projecting position, where the locking ball is able to penetrate into a groove of the shaft and to oppose the axial displacement of the shaft relative to the cylinder body, and a retracted position, where the locking ball does not penetrate into the groove of the shaft.

9. The connection device according to claim 7, wherein the locking means also comprise a locking ring movable in an auxiliary cavity of the cylinder body along the central axis, between a locking position in which a truncated conical surface of the locking ring holds the locking ball projecting into the groove of the shaft, and a release position in which the locking ball is in its retracted position and received in a groove of the locking ring.

10. The connection device according to claim 9, wherein the truncated conical surface of the locking ring defines a taper that flares towards the groove of the locking ring.

11. The connection device according to claim 9, wherein the connection device comprises an elastic member for pushing the locking ring towards its locking position.

12. The connection device according to claim 8, wherein the connection device comprises a protection ring surrounding the shaft, movable along the central axis in an internal channel in which the shaft moves, and driven by the shaft during its movement from the intermediate position to its connected position, between a protected position in which the protection ring faces the recess of the cylinder body so as to hold the locking ball in a retracted position, and a retracted position in which the protective ring no longer holds the locking ball in a retracted position.

13. The connection device according to claim 8, wherein the locking ring and the auxiliary cavity of the cylinder body define a chamber connected to a pipe that allows the chamber to be supplied with fluid under pressure.

14. The connection device according to claim 1, wherein the connection device comprises a first pipe connected to the front chamber and a second pipe connected to the rear chamber, the first pipe and the second pipe allowing to supply the front chamber and the rear chamber, respectively, with fluid under pressure.

15. A connection assembly of a mobile plate to a fixed plate comprising:
a movable plate supporting at least a first circuit connection element,
a fixed plate supporting at least one connecting element complementary to the first element of the mobile plate,
at least one centering member configured to position the movable plate and the fixed plate relative to each other,
wherein one of the said plates comprises a connection device according to claim 1, the other of the said plates comprising a locking barrel defining a mouth able to axially retain the locking members of the connection device in the locking barrel, when they are in their locking configuration.

* * * * *